United States Patent
Partlow et al.

(10) Patent No.: US 11,784,037 B2
(45) Date of Patent: Oct. 10, 2023

(54) LASER-DRIVEN LIGHT SOURCE WITH ELECTRODELESS IGNITION

(71) Applicants: Hamamatsu Photonics K.K., Hamamatsu-Shi (JP); ENERGETIQ TECHNOLOGY, INC., Wilmington, MA (US)

(72) Inventors: Matthew Partlow, Townsend, WA (US); Donald Smith, Newton, MA (US); Matthew Besen, Andover, MA (US); Akinori Asai, Hamamatsu-shi (JP)

(73) Assignees: Hamamatsu Photonics K.K., Hamamatsu (JP); ENERGETIQ TECHNOLOGY, INC., Wilmington, MA (US)

( * ) Notice: Subject to any disclaimer, the term of this patent is extended or adjusted under 35 U.S.C. 154(b) by 0 days.

(21) Appl. No.: 18/161,282

(22) Filed: Jan. 30, 2023

(65) Prior Publication Data
US 2023/0178357 A1 Jun. 8, 2023

Related U.S. Application Data

(63) Continuation of application No. 17/328,433, filed on May 24, 2021, now Pat. No. 11,587,781.

(51) Int. Cl.
*H01J 65/00* (2006.01)
*H01J 61/54* (2006.01)
(Continued)

(52) U.S. Cl.
CPC .............. *H01J 61/54* (2013.01); *H01J 61/16* (2013.01); *H01J 65/00* (2013.01); *H01J 65/04* (2013.01);
(Continued)

(58) Field of Classification Search
CPC ............ H01J 61/54; H01J 65/00; H01J 65/04
(Continued)

(56) References Cited

U.S. PATENT DOCUMENTS 9,576,785 B2  2/2017 Blondia
9,609,732 B2  3/2017 Smith
(Continued)

FOREIGN PATENT DOCUMENTS

KR  10-2016-0071231 A   6/2016
RU       2780202 C1   9/2022
(Continued)

OTHER PUBLICATIONS

International Search Report and Written Opinion received for PCT Application Serial No. PCT/US2022/029536 dated Sep. 7, 2022, 8 pages.

*Primary Examiner* — Christopher M Raabe
(74) *Attorney, Agent, or Firm* — Rauschenbach Patent Law Group, PLLC; Kurt Rauschenbach

(57) ABSTRACT

An electrodeless laser-driven light source includes a laser source that generates CW sustaining light. A pump laser generates pump light. A Q-switched laser crystal is positioned to receive the pump light and generates pulsed laser light in response to the generated pump light that propagates to a breakdown region in a gas filled bulb comprising an ionizing gas. A detector detects plasma light generated by a CW plasma located at least partly in a CW plasma region in the gas filled bulb comprising the ionizing gas and generates a detection signal. A controller generates control signals that control the pump light to the Q-switched laser crystal so as to extinguish the pulsed laser light within a time delay after the detection signal exceeds a threshold level.

25 Claims, 8 Drawing Sheets

(51) Int. Cl.
*H01S 3/1115* (2023.01)
*H01S 3/094* (2006.01)
*H01S 3/091* (2006.01)
*H01S 3/16* (2006.01)
*H01S 3/06* (2006.01)
*H01J 61/16* (2006.01)
*H01J 65/04* (2006.01)
*H01S 3/13* (2006.01)

(52) U.S. Cl.
CPC .......... *H01S 3/0602* (2013.01); *H01S 3/0621* (2013.01); *H01S 3/0912* (2013.01); *H01S 3/094038* (2013.01); *H01S 3/1115* (2013.01); *H01S 3/1623* (2013.01); *H01S 3/1643* (2013.01); *H01S 3/1305* (2013.01)

(58) Field of Classification Search
USPC ........................................................ 313/637
See application file for complete search history.

(56) References Cited

U.S. PATENT DOCUMENTS

| | | | |
|---|---|---|---|
| 9,678,262 B2 | 6/2017 | Görtz et al. |
| 9,741,553 B2 | 8/2017 | Blondia |
| 9,748,086 B2 | 8/2017 | Blondia |
| 9,922,814 B2 | 3/2018 | Blondia |
| 10,008,378 B2 | 6/2018 | Blondia |
| 10,057,973 B2 | 8/2018 | Blondia |
| 10,078,167 B2 | 9/2018 | Brune et al. |
| 10,109,473 B1 | 10/2018 | Blondia et al. |
| 10,186,414 B2 | 1/2019 | Blondia |
| 10,186,416 B2 | 1/2019 | Blondia |
| 10,203,247 B2 | 2/2019 | Brady et al. |
| 10,217,625 B2 | 2/2019 | Bezel et al. |
| 10,222,701 B2 | 3/2019 | Zhao et al. |
| 10,770,282 B1 | 9/2020 | Abramenko et al. |
| 11,587,781 B2 | 2/2023 | Partlow et al. |
| 11,637,008 B1 * | 4/2023 | Kumar ................. G01N 21/211 313/113 |
| 2005/0276285 A1 | 12/2005 | Huang et al. |
| 2017/0135192 A1 | 5/2017 | Huang et al. |
| 2017/0150590 A1 | 5/2017 | Chimmalgi et al. |
| 2019/0021158 A1 | 1/2019 | Nozaki |
| 2019/0037676 A1 | 1/2019 | Khodykin et al. |
| 2019/0045615 A1 | 2/2019 | Mori et al. |
| 2019/0053364 A1 | 2/2019 | Mori et al. |
| 2019/0075641 A1 | 3/2019 | Kuritsyn et al. |
| 2020/0393687 A1 | 12/2020 | Yabu et al. |
| 2021/0120659 A1 | 4/2021 | Szilagyi et al. |
| 2022/0375740 A1 | 11/2022 | Partlow et al. |

FOREIGN PATENT DOCUMENTS

| | | |
|---|---|---|
| WO | 2018/136683 A1 | 7/2018 |
| WO | 2019/023150 A1 | 1/2019 |
| WO | 2019/023303 A1 | 1/2019 |

\* cited by examiner

LASER-DRIVEN LIGHT SOURCE WITH ELECTRODELESS IGNITION

CROSS-REFERENCE TO RELATED APPLICATION

The present application is a continuation of U.S. patent application Ser. No. 17/328,433, filed on May 24, 2021, entitled "Laser-Driven Light Source with Electrodeless Ignition". The entire disclosure of this patent application is incorporated herein by reference.

The section headings used herein are for organizational purposes only and should not be construed as limiting the subject matter described in the present application in any way.

INTRODUCTION

Numerous commercial and academic applications have need for high brightness light over a broad wavelength range. For example, laser-driven light sources are available that provide high brightness over spectral ranges from the extreme UV through visible and into the infrared regions of the spectrum with high reliability and long lifetimes. Various examples of such high-brightness light sources are produced by Energetiq, a Hamamatsu Company, located in Wilmington, Mass.

There is growing demand for high-brightness light sources for applications including, for example, semiconductor metrology, sensor calibration and testing, creating shaped light, surface metrology, spectroscopy and other optical measurement applications in diverse fields including biology, chemistry, climate, and physics. As such, advances are needed in high-brightness light sources that can improve, for example, size, cost, complexity, reliability, stability and efficiency of this important type of broadband light sources.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1A:
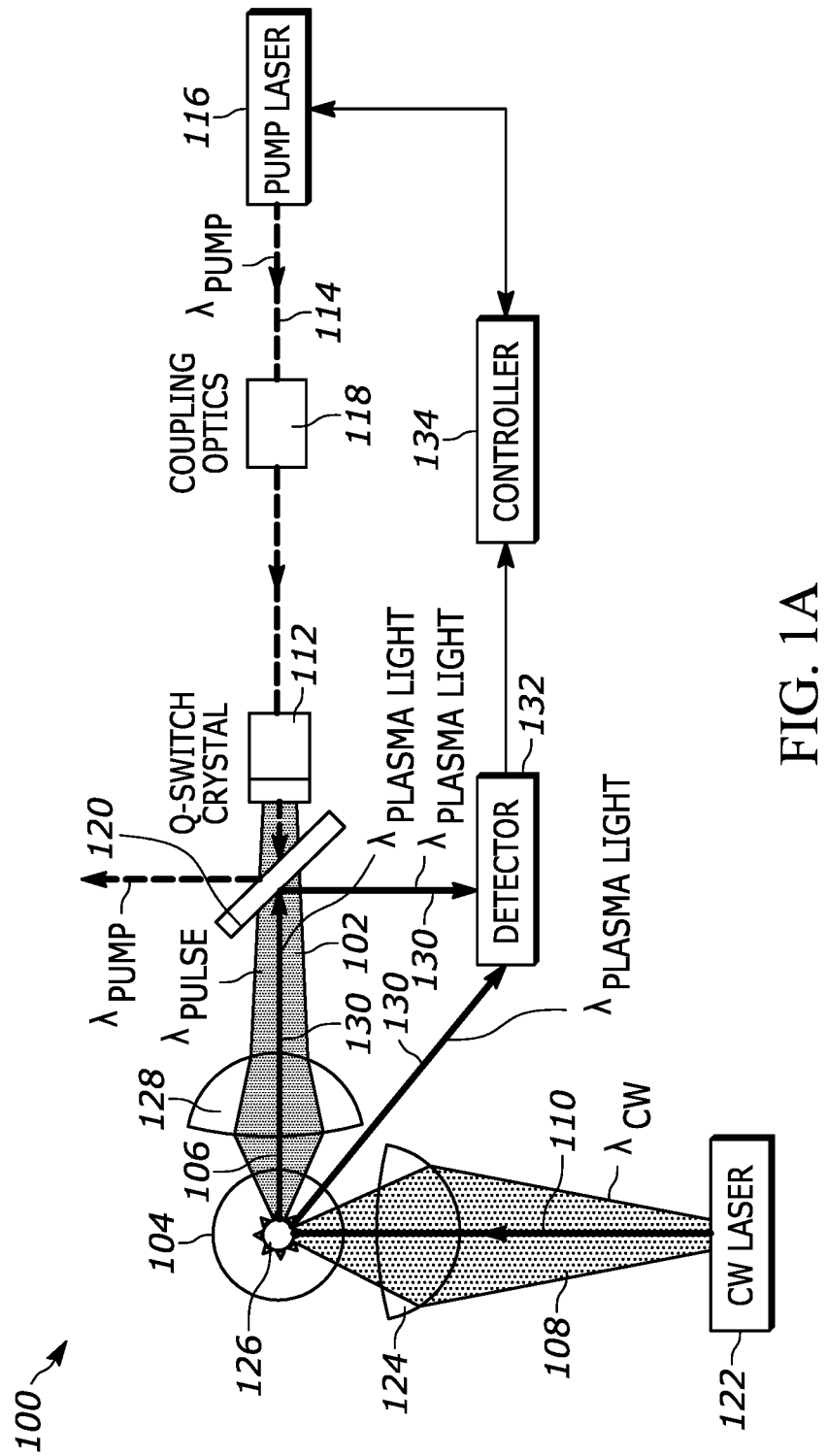
FIG. 1A illustrates an embodiment of an electrodeless laser-driven light source that uses pulsed laser light projected into a gas-filled bulb along one axis and CW laser light projected into the gas-filled bulb along a different axis according to the present teaching.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Laser driven light sources use a CW laser to directly heat a gas plasma to the high temperature needed to produce broadband optical light. High-brightness laser driven light sources have a significant advantage compared to light sources that use high-voltage electrodes to sustain a plasma. Laser driven sources depend on optical-discharge plasma as opposed to electric discharge plasma used in, for example, arc-lamp devices. In electric discharge lamps, electrode materials can evaporate, and change the properties of the discharge over the life of the lamp. This reduces lamp lifetime. Also, electrode-based systems lead to thermal, mechanical and electrical stress of the light source. Known laser driven light sources do not rely on electrodes to sustain the plasma, however they still utilize electrodes for plasma ignition.

Known light sources that rely on electrodes can have serious limitations. For example, electrode-based light sources can have limits on the lamp head size and restrictions on how bulb can be mounted. Electrode-based light sources must be designed to avoid parasitic arcs, and the lamp head needs be configured with sufficient volume for electrodes and for ignition circuit. Electrode-based light sources have limitations on the cold fill pressure of the bulb because, for example, the glass-to-metal seal of electrodes can limit the maximum fill pressure. Also, the size of the bulb can be larger in electrode-based light sources, which can affect bulb fill pressure. Electrode-based light sources also have limited bulb shapes that can be accommodated. This is because, for example, electrode-based light sources require positioning, securing, and connecting electrodes. These design constraints can result in producing noise in the light source.

Thus, providing a laser driven light source with electrodeless ignition can lead to improved reliability, performance, reduced cost and complexity in addition to other benefits. Igniting a plasma with optical illumination requires careful design and control of the light source and associated light delivery mechanisms used to ignite the plasma. One feature of the present teaching is providing a laser-driven light source with electrodeless ignition. In these sources, the plasma is ignited by optical illumination, and not by electrical energy provided by an electrode as in known laser driven high-brightness light sources.

There are numerous features and benefits of electrodeless laser driven light sources. Electrodeless light sources can be implemented using a smaller bulb with higher maximum fill pressures than prior art light sources. A higher fill pressure can result in higher brightness, especially in certain laser power regimes. Electrodeless light sources have no contamination from electrode material. In addition, there are fewer lamp shape geometry limitations. Generally smaller lamp heads can be used for the same characteristics. Also, there are no active electrical components to power, thereby reducing the need for an associated power supplies, control electronics and electrical connection, which significantly reduces the number of required components. However, some embodiments of electrodeless laser drive light source can be implemented in the existing lamp package of laser-driven light sources that do have electrode ignition. This is at least, in part, because the electrodeless device is generally less complex and smaller than electrode-lased laser driven light sources.

FIG. 1A illustrates an embodiment of an electrodeless laser-driven light source 100 that uses pulsed laser light 102 projected into a gas-filled bulb 104 along one axis 106 and CW laser light 108 projected into the gas-filled bulb 104 along a different axis 110 according to the present teaching. The pulsed laser light 102 is generated using a Q-switch crystal 112 that is pumped with pump laser light 114 generated by a pump laser 116. Coupling optics 118 are used to couple the pump laser light 114 into the Q-switch crystal 112. An optical element 120 is used to direct the pulsed laser light 102 generated in the Q-switch crystal 112 toward the bulb 104 and to direct the pump laser light 114 away from the bulb. In some embodiments, the optical element 120 is a dichroic optical element. Energy from the pulsed laser light 102 provided to the plasma breakdown region 126 ignites the plasma.

A CW laser generates the CW laser light 108. An optical element 124 projects and/or focuses the CW sustaining light to a region comprising a plasma breakdown region 126 in the bulb 104. In some embodiments, the optical element 124 is a focusing element such as a lens. An optical element 128 projects and/or focuses the pulsed laser light 102 to a region comprising a plasma breakdown region 126 in the bulb 104. In some embodiments, the optical element 128 is a focusing element such as a lens. The region illuminated by the pulse laser light is referred to as the pulse illumination region, and has a well-defined position and shape based on the projection elements used to direct the optical light from the Q-switch crystal 112. Energy from the pulsed laser light 102 provided to the plasma breakdown region 126 ignites the plasma. The region illuminated by the CW sustaining light is referred to as the CW sustaining illumination region, and has a well-defined position and shape based on the projection elements used to direct the optical light from the CW laser 122. Energy from the CW laser light 108 provided to the plasma breakdown region 126 sustains the plasma.

The plasma breakdown region 126 produces CW plasma light 130. The CW plasma light 130 is incident on a detector 132. The CW plasma light 130 may be directed to the detector 132 by the optical element 120, or via free space and/or by other optical transmission means. The detector 132 generates a detection signal at an output that is connected to a controller 134. The controller 134 is connected to a control input of the pump laser 116. The controller 134 generates control signals that control the parameters of the pump light 114 that is directed to the Q-switch laser crystal 112. In some embodiments, the controller 134 is configured to control the pump laser 116 and parameters of the pump light 114 in such a way as to extinguish the pulsed laser light 102 within a time delay after the detection signal from the detector 132 exceeds a predetermined threshold level.

The high-peak-power pulsed light 102 is needed to ignite the plasma in the plasma breakdown region 126. However, to generate sustained CW plasma light 130, the pulsed light must not exceed a certain threshold, which can occur if pulses are present in the plasma after a predetermined delay after the plasma light reaches a predetermined threshold. Too much pulse light can extinguish the plasma. By extinguishing the pulsed light before the threshold is achieved, the plasma light can be sustained by application of only the CW sustaining light 108.

In some embodiments, a certain number, for example, one or more of pulses from the pulse light are needed to ignite a plasma, but additional pulses after ignition will quench the plasma. As such, once plasma light 130 is detected at the detector 132, the pulses are extinguished before a next pulse is generated after the igniting pulse. It should be understood that this configuration is just one example of this aspect of the present teaching. Various algorithms and thresholds for extinguishing the pump light 114 after various delays relative to the onset of plasma light 130 can be used by systems according to the present teaching. These parameters would be dependent on various factors including, for example, the type, density and/or temperature of gas. Also, these parameters would be dependent on the relative powers of the pulsed light, and CW sustaining light 108. Also, these parameters would be dependent on the focusing and other optical properties of optical elements 124, 128. In addition, these parameters would be dependent on the energy density of the CW sustaining light 108 and/or the pulsed light 102 in the plasma breakdown region.

One feature of the present teaching is that the axes of the pulsed light and the CW sustaining light can take on various relative positions. For example, referring to FIG. 1A, the axes 106, 110 are nominally orthogonal. It is also possible to configure the electrodeless laser-drive light source so the pulsed light and CW light are on the same axis.

Figure 1B:
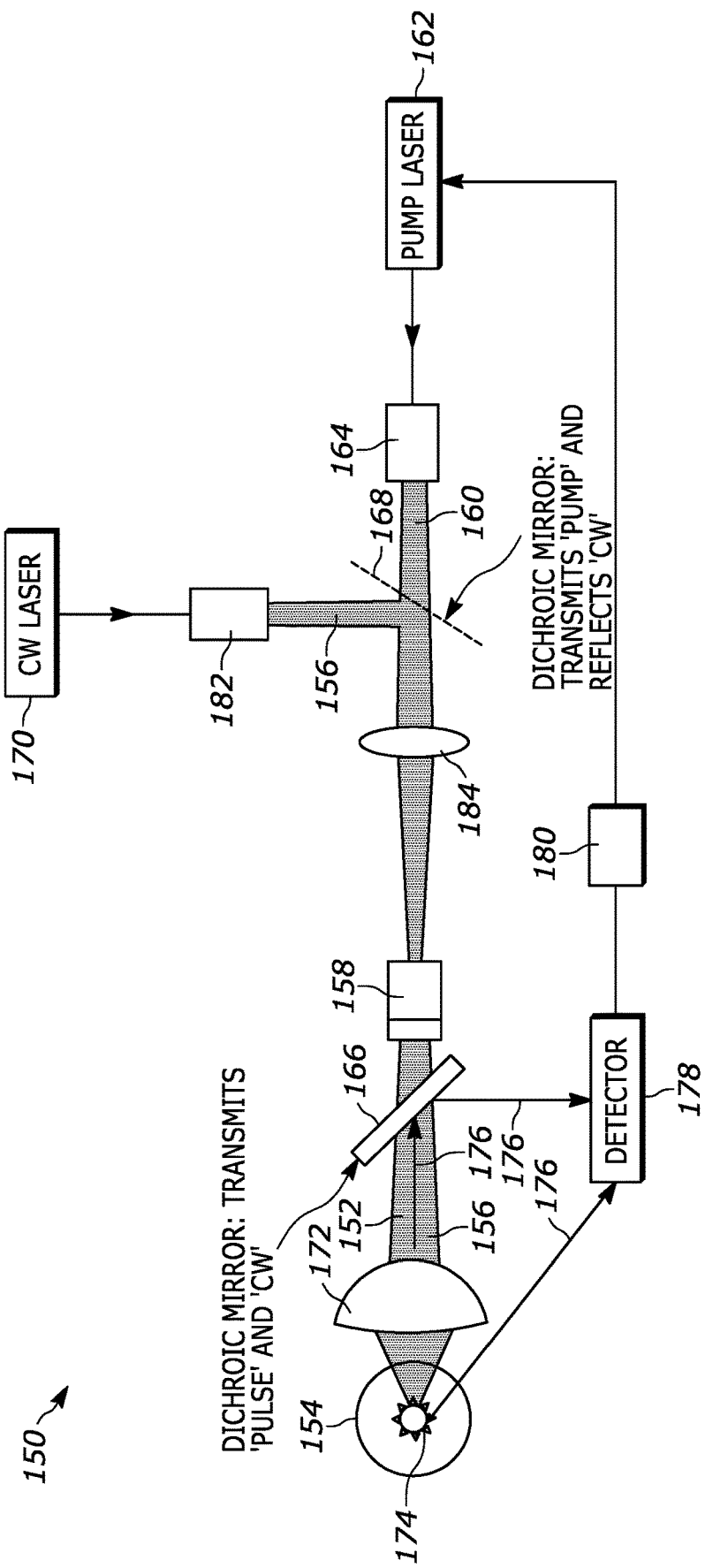
FIG. 1B illustrates an embodiment of an electrodeless laser-driven light source that uses pulsed laser light projected into a gas-filled bulb along one axis and CW laser light projected into the gas-filled bulb along the same axis according to the present teaching.

FIG. 1B illustrates an embodiment of an electrodeless laser-driven light source 150 that uses pulsed laser light 152 projected into a gas-filled bulb 154 along one axis and CW laser light 156 projected into the gas-filled bulb along the same axis according to the present teaching. The electrodeless laser-driven light source 150 shares many common elements as the electrodeless laser-driven light source 100 of FIG. 1A. A Q-switch crystal 158 is pumped with pump laser light 160 generated by a pump laser 162. Coupling optics 164, which in some embodiments, is a collimation package that nominally collimates light, receives the light generated by the pump laser 162 and directs it to the Q-switch crystal 158.

An optical element 166 is used to direct the pulsed laser light 152 generated in the Q-switch crystal 158 toward the bulb 154. The optical element 166 can direct (e.g. reflect) the pump laser light 160 away from the bulb 154. In some embodiments, the optical elements 166, 168 are dichroic optical elements. In some embodiments, optical element 166 transmit light with the pulsed light wavelength 152 and also transmits CW laser light 156. A CW laser 170 generates the CW laser light 156. An optical element 172 projects and/or focuses the CW sustaining light 156 and the pulsed laser light 152 to a region comprising a plasma breakdown region 174 in the bulb 154. In some embodiments, the optical element 172 is a focusing element such as a lens.

The plasma breakdown region 174 produces CW plasma light 176. The CW plasma light 176 is incident on a detector 178. The CW plasma light 176 may be directed to the detector 178 by the optical element 166, or via free space and/or by other optical transmission means. The detector 178 generates a detection signal at an output in response to the detected CW plasma light. The output of the detector 178 is connected to a controller 180. The controller 180 is connected to a control input of the pump laser 162. The controller 180 generates control signals that control the parameters of the pump light 160 that is directed to the Q-switch laser crystal 158. In some embodiments, the controller 180 is configured to control the pump laser 162 and associated parameters of the pump light 160 in such a way as to extinguish the pulsed laser light 152 within a time delay after the detection signal from the detector 178 exceeds a predetermined threshold level. In some embodiments, the light from the CW laser 170 is collimated using a collimation package 182. An optical element 184, which may comprise one or more optical elements, is used to focus the pump laser light 160 onto the Q-switch crystal 158.

Another feature of the present teaching is that the pulsed light and the CW sustaining light can, in some embodiments, be directed to form independent illumination regions in the plasma region. The two illumination regions can be distinct or can overlap in part or in whole, as desired. The control over the relative positions and shapes of the pulsed illumination region and the CW sustaining illumination region can be used to provide particular spatial distributions of energy delivered by these two sources. As described further herein, the energy density of each of the CW sustaining light and the pulsed light impact the ignition and sustainability of the plasma. As such, the ability to control the relative positions and shapes of the pulsed illumination region and the CW sustaining illumination region allows control of the energy density profiles provided to the plasma. This positioning affects the ability for the ignited plasma generated in the pulsed illumination region to transition to the CW illumination region as a stable CW plasma.

Figure 2A:
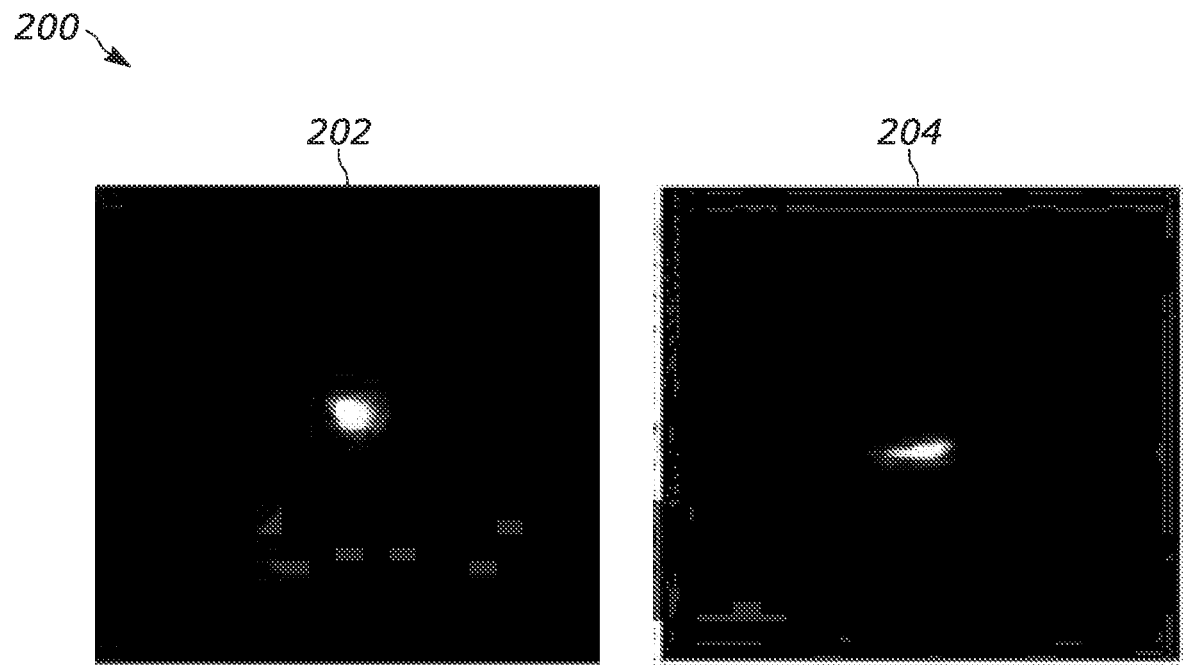
FIG. 2A illustrates images of a gas-filled bulb in an embodiment of an electrodeless laser-driven light source according to the present teaching that shows the emission with only pulse laser excitation.

FIG. 2A illustrates images 200 of a gas-filled bulb in an embodiment of an electrodeless laser-driven light source according to the present teaching that shows the emission with only pulse laser excitation. Both images 202, 204 are shown from their side-view, but they are offset in angle to illustrate the three-dimensional positioning of the locations of the pulsed illumination region and the focus of the CW laser. The extent and position of the pulsed illumination region is visible in these images 202, 204. Note that the position of pulse breakdown depends on the pulse energy. As the energy increases, breakdown location moves toward pulsed laser. Three-dimensional alignment of the pulse laser breakdown plasma relative to the pulsed light and relative to the focus of the CW laser allows the method to work with lower CW laser power and/or lower pulse energy.

Figure 2B:
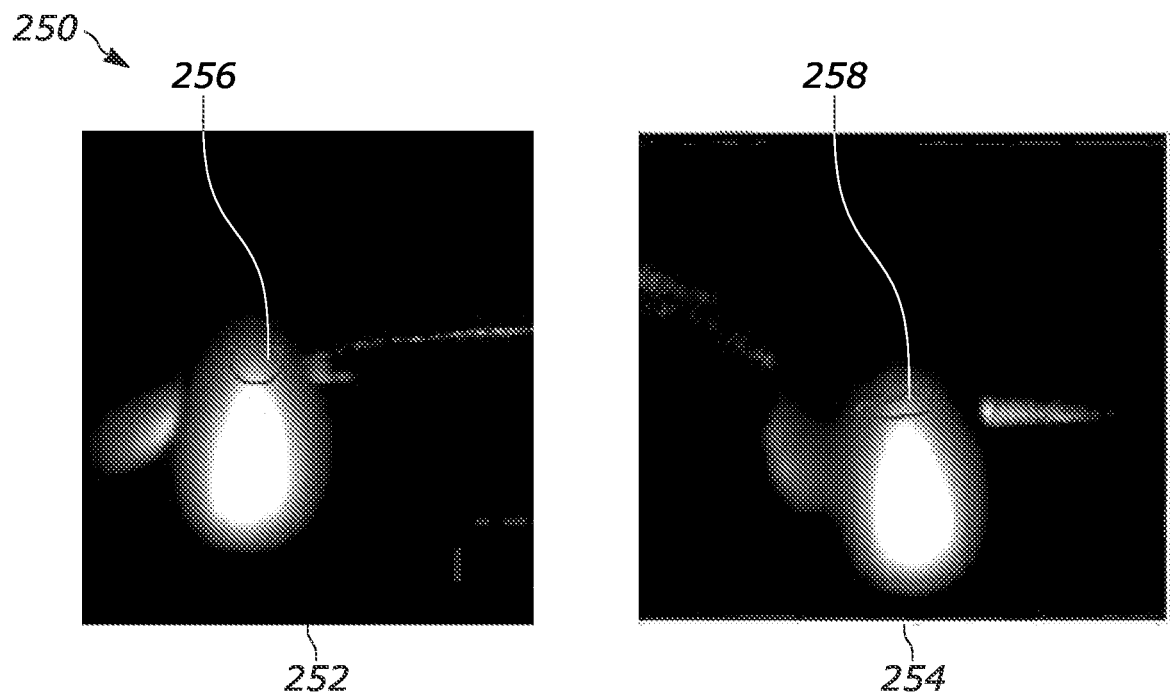
FIG. 2B illustrates images of the gas-filled bulb shown in FIG. 2A that shows the emission with only CW laser excitation.

FIG. 2B illustrates images 250 of the gas-filled bulb shown in FIG. 2A that shows the emission with only CW laser excitation. Both images 252, 254 are shown from their side-view, but they are offset in angle to illustrate the three-dimensional positioning of the locations of the pulsed illumination region and the focus of the CW laser. The extent and position of the pulsed illumination region is visible in these images 252, 254. Outlines 256, 258 of the pulse illumination regions from the images 202, 204 of FIG. 2A are also illustrated. In this embodiment, the relative positions and shapes of the pulsed illumination region and the CW sustaining illumination region are such that the two regions are distinct and do not overlap. The pulse illumination region is smaller as the light is more tightly focus, resulting in a high density of pulsed energy delivered to the plasma by the illumination.

The images of FIGS. 2A-B were collected during experiments to determine operating parameters for pulses that provide plasma ignition. Some details of the experimental conditions are described below. For example, with a 2-kHz pulse rate and 1-ns-duration pulse, stable plasma ignition can be realized in a xenon gas-filled bulb over a range of energies from 135 to 225 micro Joule. The pulse light had a 1064 nm wavelength. For this particular example of an experimental configuration, the threshold energy to breakdown light to achieve a stable CW plasma was 135 micro Joule. Furthermore, at 210 micro Joules, the plasma ignites and can eventually be stable, but there can be ignition and extinguishing of CW plasma before the stable operation. It is also possible to realize ignition at 225 micro Joules. Above 240 micro Joules, the CW plasma was not stable in some configurations. The relative position of the pulsed light illumination and the CW light illumination is critical. Adjusting the bulb and CW laser alignment along the optical axis of the pulsed laser improves or 'turns off' ignition. After a CW plasma was lit, the CW laser power could be lowered to 8-10 Watts and still sustain the CW laser plasma. At any value of CW laser power above 15.5 Watts, there was reliable transition from pulse to CW. There was no upper limit on CW laser power. As understood by those skilled in the art, the beam quality affects the energy delivered to the gas for a given laser power.

Another feature of the electrodeless ignition of the present teaching is the recognition that CW plasma ignition can be implemented as a two-step process. In a first step, the xenon gas breaks down with the application of a laser pulse. In a second step, there is a transition or a "handoff" from the pulse plasma to a sustained CW plasma. Then, a shut-off for the pulse laser light is performed after the sustained plasma begins to be produces results in a successful handoff. For example, by performing a shutoff at "first light" of the CW plasma, a handoff can be realized. It is important to shut off the pulse light before additional pulses after ignition, because subsequent pulses can knock-out the CW plasma light. The number of pulses that can be tolerated is dependent of the power of the CW plasma light. In some embodiments, the pulse light is extinguished in a time delay that is short enough so that the next pulse in the period after the igniting pulse is extinguished.

Figure 3:
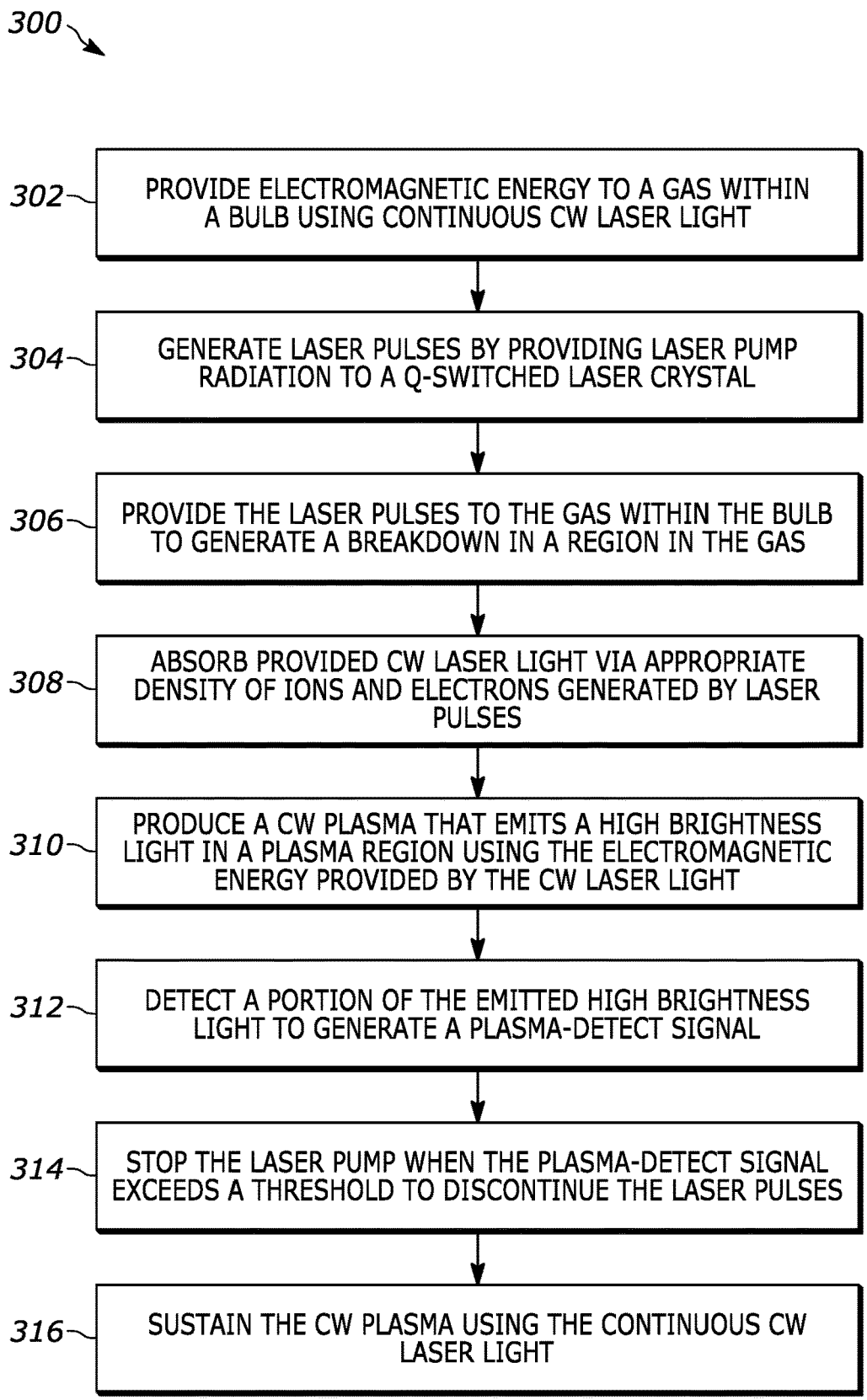
FIG. 3 illustrates a flow diagram of steps of a method to ignite a plasma in an electrodeless laser-driven light source according to the present teaching.

FIG. 3 illustrates a flow diagram 300 of steps of a method to ignite a plasma in an electrodeless laser-driven light source according to the present teaching. The flow diagram 300 illustrates the steps to control the delivery of energy into a plasma region contained in a gas-filled bulb to produce high brightness light in which the plasma is ignited by illumination rather than by electrical energy provided by an electrode as in prior art high-brightness light sources. In a first step 302, electromagnetic energy is provided to a gas within a bulb using continuous CW laser light. This may be referred to a CW sustaining light. In some embodiments, the gas is xenon gas. In a second step 304, laser pulses are generated by providing pump laser light to a Q-switched crystal. One feature of the present teaching is the recognition that the pulses provided by the Q-switch crystal can be controlled by controlling the application of the pump light to the crustal. In a third step 306, the laser pulses are provided to the gas in the bulb, which causes a breakdown region to form in the gas. In a fourth step 308, the CW laser light provided to the bulb is absorbed when the appropriate density of ions and electrons generated by the pulse light is achieved. In a fifth step 310, the absorption of the CW laser light energizes the ions and electrons and produces a CW plasma that emits a high brightness light in a plasma region. That is, the electromagnetic energy provided by the CW sustaining light leads to production of CW plasma light from the bulb.

In a sixth step 312, a portion of the emitted high brightness light from the bulb is detected in a detector. The detector generates a plasma-detect signal in response to the portion of the CW plasma light that it receives. This signal can be provided to a controller. In a seventh step 314, the pump laser is stopped when the plasma-detect signal exceeds a predetermined threshold. The cessation of the pump causes discontinuation of the pulses. That is, the pulse light is extinguished in response to stopping the pump light from reaching the Q-switch crystal. In some embodiments, the controller stops the laser pump. In an eighth step 316, the CW plasma is sustained using the CW sustaining light. We note that in some embodiments the CW continuous light is nominally a continuous light source that is produced by pulsed laser operation at a high pulse rate.

Various embodiments of the laser-driven high brightness sources with electrodeless ignition of the present teaching use different parameters of the light provided to the gas. For example, the repetition rate of Q-switched laser pulses can be controlled. The pulse energy of the pulse light that is provided to the gas can be controlled. The duration of the Q-switch laser pulses can also be controlled. In addition, the power of the CW laser light is also controlled. In some embodiments, a pulse repetition rate of the pulsed laser light is in a range of 1 kHz to 20 kHz.

Experimental and/or theoretical evaluations have determined that quality CW plasma can be provided, for example, when the Q-switch laser crystal is configured so that a pulse repetition rate of the pulsed laser light is less than or equal to 1 kHz. Continuous wave plasma can be produced when the Q-switched laser crystal is configured so that a pulse energy of the pulsed laser light is in a range of 50 micro Joules to 500 micro Joules.

Continuous wave plasma is produced under a variety of pulse energy, pulse duration, and CW power conditions depending on the particular configuration. For example, continuous wave plasma is produced when the Q-switch laser crystal is configured so that a pulse energy of the pulsed laser light is in a range of 500 micro Joules to 5 millijoules. In addition, continuous wave plasma can be produced when the Q-switch laser crystal is configured so that a pulse duration of the pulsed laser light is in a range of 0.1 ns to 10 ns. Continuous wave plasma can also be produced when the CW laser source is configured so that a power of the CW sustaining light is in a range of 5 W to 50 W. Also, continuous wave plasma can be produced when the CW laser source is configured so that a power of the CW sustaining light is in a range of 5 W to 1500 W. The ranges described above are just examples of operating ranges, and not intended to limit the present teaching in any way.

Figure 4:
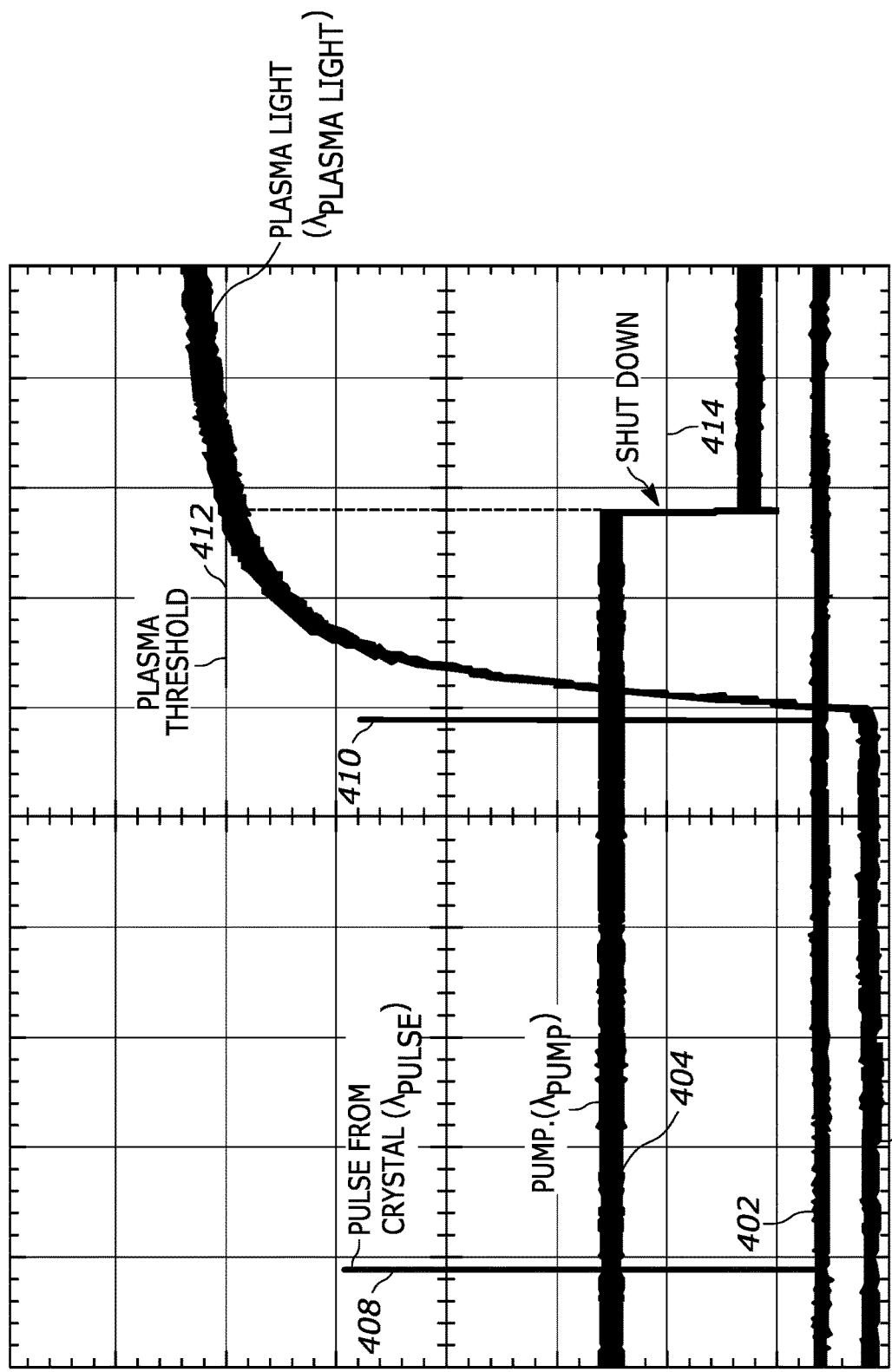
FIG. 4 illustrates a set of oscilloscope traces for each of the pulsed laser illumination, the pump laser illumination, and the plasma emission from an electrodeless laser-driven light source according to the present teaching.

One feature of the present teaching is that the detection of CW plasma can be used to control the igniting pulsed laser light. In some embodiments, this control prevents the extinguishing or other undesirable impact of pulses on the CW plasma light after the plasma is ignited. FIG. 4 illustrates a set of oscilloscope traces 400 for each of the pulsed laser illumination, the pump laser illumination, and the plasma emission from an electrodeless laser-driven light source according to the present teaching. The set of oscilloscope traces 400 illustrates the timing of the laser operation and plasma light generation in an embodiment of an electrodeless laser-driven light source of the present teaching. In FIG. 4, a measured pulsed laser illumination trace 402, a measured pump laser illumination trace 404, and a measured plasma emission trace 406 are shown as a function of time in the set of oscilloscope traces 400. The presence of pump light shown in trace 404 generates the two pulses 408, 410 visible in the pulse light trace 402. Plasma ignition begins after the second pulse 410, causing an increase in measured CW plasma light shown in trace 406.

The controller used in the system that generated these data is configured such that when the detected CW plasma light shown in trace 406 reached a threshold value 412, the pump was shut down 414. The extinguished pulses from the Q-switch crystal are shown in trace 402. Various control configurations are possible instead of or in addition to the conditions shown in the set of oscilloscope traces 400 of FIG. 4. The shutdown of the pump laser or extinguishing of the pump laser light be configured to occur nominally immediately after a threshold of CW plasma light is realized. The shutdown of the pump laser or extinguishing of the pump laser light can also be configured to occur after a predetermine delay after a threshold of CW plasma light is realized. In various methods according to the present teaching, various threshold can be utilized to achieve the desired performance.

In some embodiments, a detection signal represents a power of the plasma light and a threshold is chosen to be a desired ratio of the power of the plasma light to an operating power. In some embodiments, the desired ratio is nominally 50%. In other embodiments, the desired ratio is nominally 90%. In yet other embodiments, the desired ratio falls within a range between 30% and 95%.

The predetermined delay can be chosen to have a particular relationship to the pulse period of the pulsed laser light. This allows that the pump is shut off before a next pulse in the sequence of pulses is generated. In some embodiments, a period between pulses in the pulsed laser light is greater than the time delay. In some embodiments, the controller is configured so that the time delay is less than one pulse period of the pulsed laser light. It should be understood that the Q-switch crystal and/or pumping configuration and power levels can be adjusted to control the pulse period.

Figure 5A:
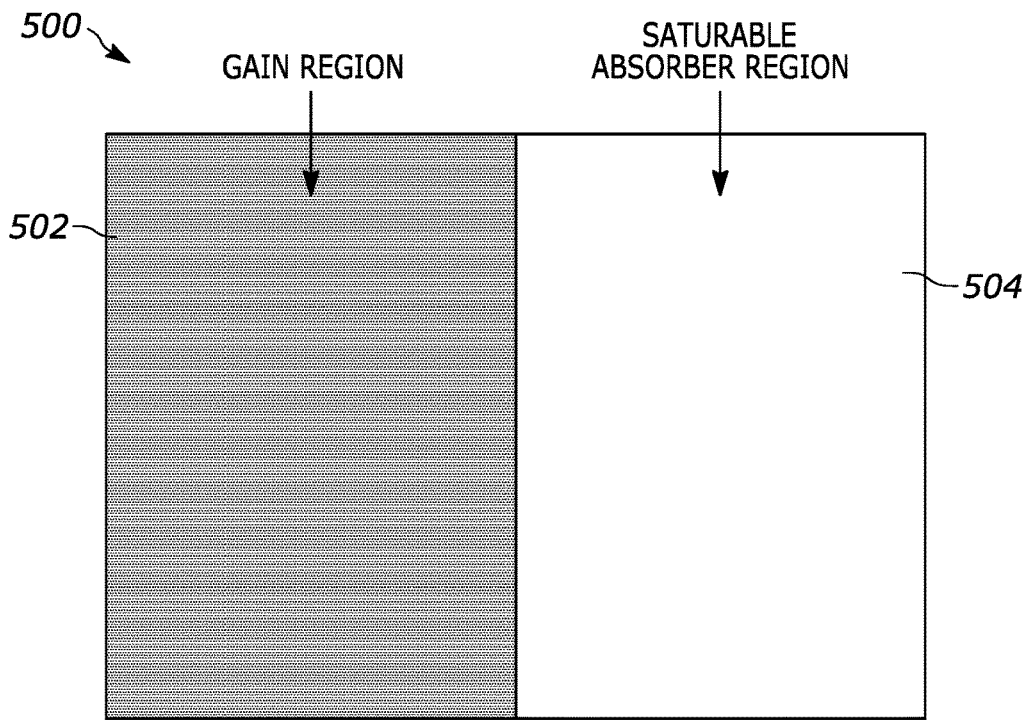
FIG. 5A illustrates an embodiment of a Q-switched crystal that includes a gain region and a saturable absorber region according to the present teaching.

One feature of the present teaching is that it can use different known Q-switch crystals. The wavelength of the pulsed light should be appropriate to cause a breakdown of the gas specie(s) in the bulb. FIG. 5A illustrates an embodiment of a Q-switch crystal 500 that includes a gain region 502 and a saturable absorber region 504 according to the present teaching. As understood by those skilled in the art, different host materials and dopants can be used to provide a suitable gain region 502 and a saturable absorber region 504. For example, the crystal 500 can have a host material that can be a glass host, an yttrium aluminum garnet host, or a spinel host. For example, the crystal 500 can have a dopant in one or both of the gain region 502 and saturable absorber region 504 that can be an ytterbium dopant, a chromium dopant, a cobalt dopant or a vanadium dopant. The Q-switch crystal can also include a narrow-band filter that can be used, for example, to reflect at least some of the plasma light and/or block wavelengths in the xenon spectrum. In some embodiments, the Q-switched laser crystal has a coating on one surface. This coating, for example, can be a protective coating, a reflective coating, and/or an anti-reflection coating.

Figure 5B:
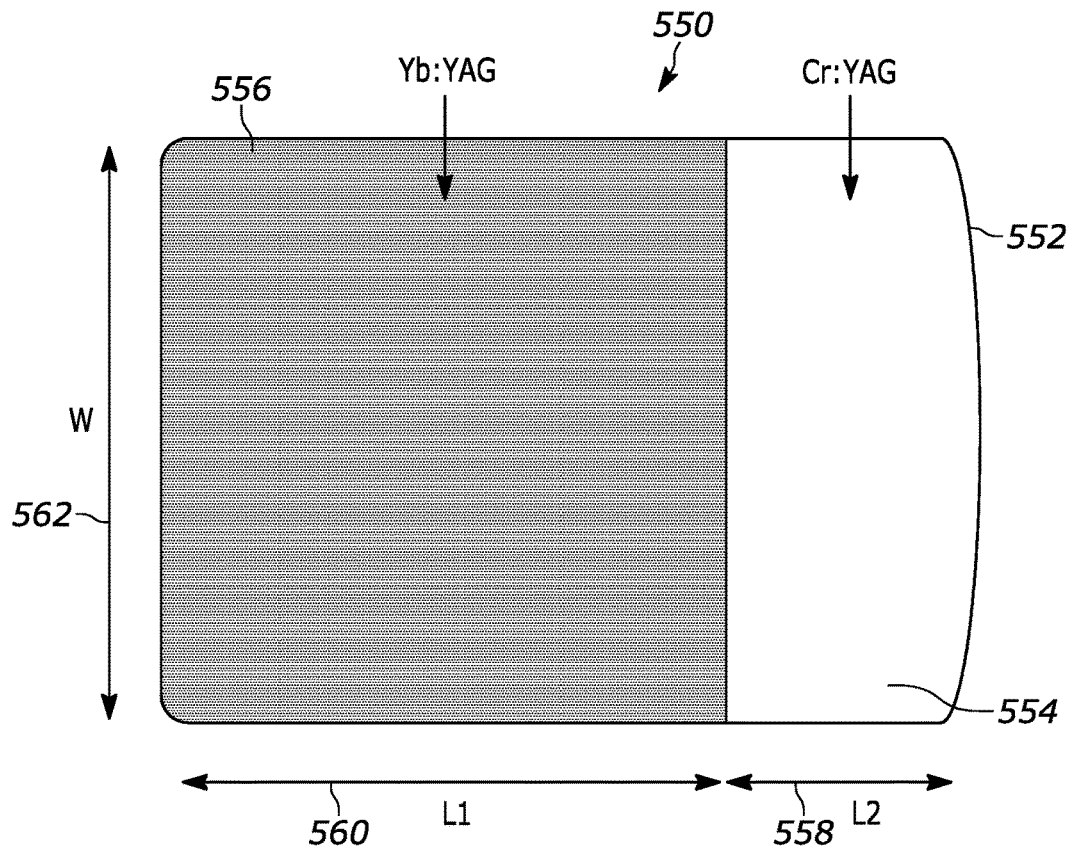
FIG. 5B illustrates an embodiment of a YAG-based passively Q-switched laser rod with a curved face suitable for use in an electrodeless laser-driven light source according to the present teaching.

FIG. 5B illustrates an embodiment of an yttrium aluminum garnet based (YAG-based) passively Q-switched laser rod 550 with a curved face 552 suitable for use in an electrodeless laser-driven light source according to the present teaching. The saturable absorber region 554 is a chromium dopant in an yttrium aluminum garnet host. The gain region 556 is an ytterbium dopant in an yttrium aluminum garnet host. The dopant and host contribute to setting the wavelength of the pulsed light as well as the rise and fall time of the pulses. A saturable absorber region length 558, L2, a gain region length 560, L1, and a crystal width 562, W, are chosen to provide desired output pulse parameters, including, for example, pulse repetition rate, pulse duration, pulse energy.

Q-switch crystals are a proven technology. For example, Q-switch crystals are used in known passively Q-switched microchip lasers. As one particular example, a microchip laser using a crystal similar to the crystal 550 described in connection with FIG. 5B, with a saturable absorber region length 558, L2=1.36 mm, a gain region length 560, L1=3 mm, and a crystal width 562, W=3 mm, provided 1.6 ns pulses having 74 microJoules of energy at 14-kH repetition rate and was realized from a 10-W pump power at 970 nm wavelength pump laser. With increasing pump power, the mean output power, and generated pulse repetition rate can be increased to 1 W and 13.6 kHz, respectively, for a pumping power 9.3 W. A maximum output power can be reached without observable thermal roll-over. An average pulse width of 1.58±0.04 ns can also be realized. In practice, a pulse energy and peak power value of 73.8±0.7 µJ, and 46.0±0.8 kW, respectively, was realized. One feature of the present teaching is that electrodeless ignition can be realized with pulsed light parameters that can be realized by these highly available, compact, reliable sources of optical pulses provided by Q-switch crystals 500, 550.

Pumping efficiency and pulse output depend on various properties of the crystal 500, 550 including for the gain crystal 502, 556, the doping element (e.g. YB or Nd), the doping percentage, and the diameter and length. For the saturable absorber crystal 504, 552, the doping element (e.g. Cr or V), the doping percentage, initial absorption percent, diameter and/or length. In some embodiments, reflection and/or transmission coatings for pump wavelength and pulsed light wavelength are provided on one or more ends of the crystal 500, 550. For example, a Yb:YAG-Cr:YAG bonded crystal can include a coating on the Yb:YAG end that is high transmission for 940 nm, and high reflection for 1030 nm. And, on the Cr:YAG end, the crystal can have a coating that is only partially reflective at 1030 nm (i.e. output coupler). While many Q-switched lasers have pump configurations that have the saturable absorber and output coupler on the opposite end from the incoming pump laser, pulsed Q-switch crystals for electrodeless ignition can have the output coupler at the pump input end, rather than the saturable absorber end.

Some embodiments of the crystal 500, 550, can have undoped end sections around the Yb&Cr YAG, which can be referred to as a non-absorbing mirror. Such a configuration avoids thermal overload and facet failure. In the gain region 502, 556, a gain medium of Nd:YAG is common and relatively low cost. A Nd:YAG gain region 502, 556 is pumped at 808 nm, and emits light at 1064 nm. A gain region 502, 556 of Yb:YAG is less common and more expensive. This material is pumped at 940 or 970 nm wavelength and emits light at 1030 nm. These Yb:YAG crystals are most commonly coated to accommodate for 940 nm pumping. Crystals coated for 940 nm may not work well at 970 nm (e.g. coating at 940 nm only 60% transmissive at 970 nm.). In addition, 940 nm wavelength light is generally easier than 970 nm light to separate from 1030 nm. It is also possible for Yb doped glass to be pumped at 975 nm. This pump wavelength is the same as used in known laser driven light source laser wavelengths.

Some important features in the design of a Q-switch crystal for producing pulsed light for electrodeless ignition according to the present teaching include, for example, choice of laser wavelength, the order of arrangement of coatings, gain section, saturable absorber section, and the direction of the pump pulse input and output. Other important features include the combining/separation of the pump and plasma beams and accommodation of a need to protect the CW laser from the pulses produced by the Q-switch crystal. Referring back to FIGS. 1A-B, different embodiments of the light source 100, 150 have different configurations for the positions of the pump laser 116, 162, Q-switch crystal 112, 158 and CW laser 122, 170 that impact these design choices. In addition, because of the high pulse energies, the mounting of the crystal and associated thermal management are important considerations.

Figure 6:
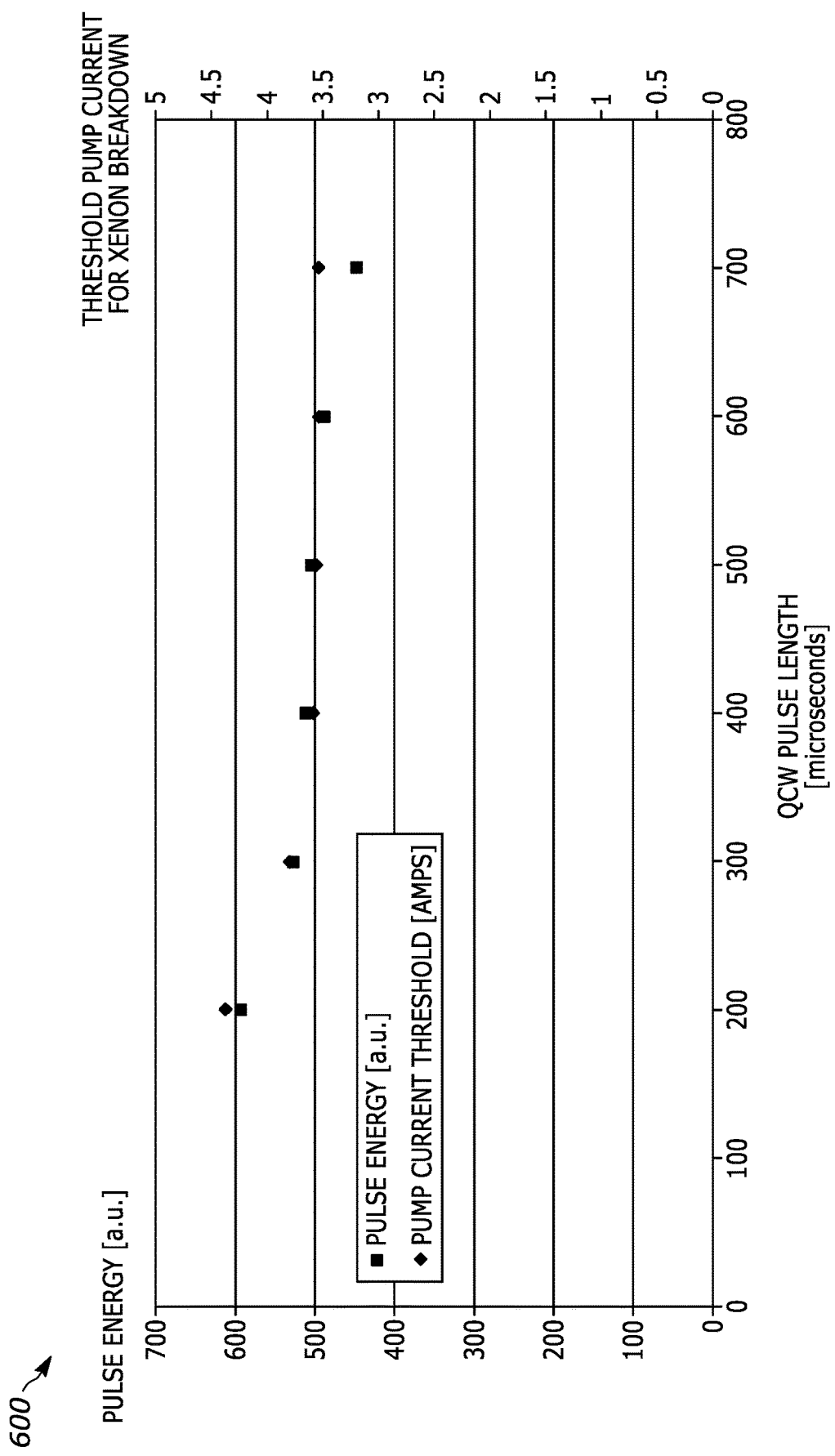
FIG. 6 illustrates a graph of the pulse energy and pump current threshold for a pump laser that creates a laser pulse sufficient to result in gas breakdown as a function of the pulse length of the quasi-CW pump pulse used in an embodiment of an electrodeless laser-driven light source according to the present teaching.

FIG. 6 illustrates a graph 600 of the pulse energy and pump current threshold for a pump laser that creates a laser pulse sufficient to result in gas breakdown as a function of the pulse length of the quasi-CW (QCW) pump pulse used in an embodiment of an electrodeless laser-driven light source according to the present teaching. That is, the pulse length is a width of a pulse that is repetitive (e.g., width of pulse in a square wave signal) that is used to generate a quasi-CW pump light signal. The graph 600 represents measurements on a bulb containing xenon gas. The graph 600 illustrates an example operating point, and shows that operation can occur over a range of pulse durations. The threshold levels out above pulse lengths of ~500 microseconds. Note that various embodiments of the light source of the present teaching can operate with parameters that are different from those illustrated in this example data. Some examples of operational parameters of pulsed ignition and transition handoff for a 22 atmosphere pressure cold bulb fill with xenon gas as on particular example are as follows: (1) a CW transition handoff can be realized with CW laser power as low as 14 W at a 980 nm wavelength; (2) a CW transition handoff can be realized with CW laser light center wavelength as low as 972 nm; (3) a nearly instantaneous CW transition handoff can be realized with CW laser light center wavelength as low as 975 nm; and 4) a CW transition handoff can be realized with CW laser power as high as 50 Watts. When the content of laser spectrum at 980 nm goes to zero, a transition handoff may take from seconds to one or two minutes. When the CW laser power is at 20 Watts, the variation of the center wavelength is between 1-2 nm away from a 980 nm center wavelength for successful transition handoff. With a 30 atmosphere cold-fill bulb, it is possible to achieve a CW transition handoff at 30 Watts and 976 nm center wavelength from the CW laser. In general, ignition is more robust with a higher pressure bulb than a lower pressure bulb. For examples, a bulb with a pressures over 30 atm would in general have a more robust ignition than a bulb with a pressure of about 22 atm.

Figure 7:
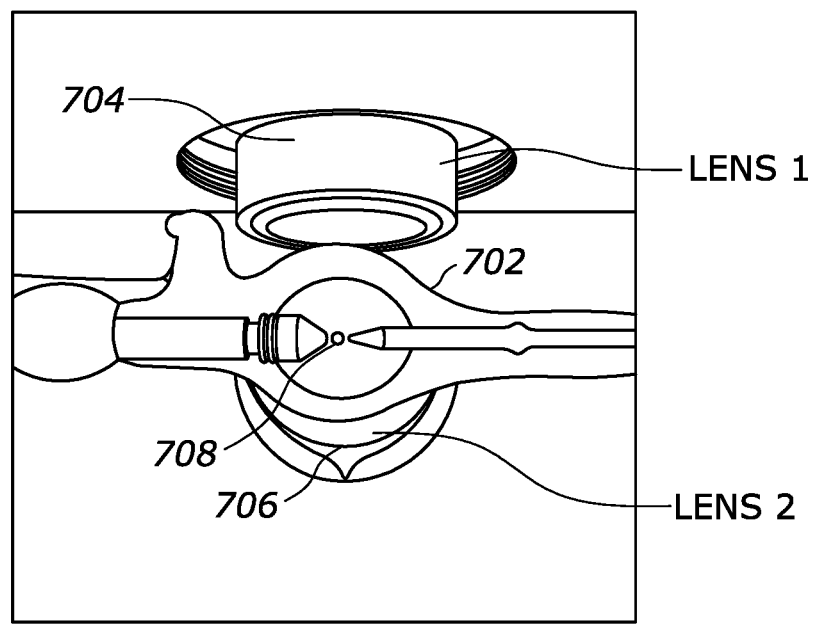
FIG. 7 illustrates a bare bulb with focusing lens assembly used in an embodiment of an electrodeless laser-driven light source according to the present teaching.

FIG. 7 illustrates a bulb system 700 including a bare bulb 702 with focusing lens assemblies 704, 706 used in an embodiment of an electrodeless laser-driven light source according to the present teaching. The plasma region 708 is shown. The focusing lens assemblies 704, 706 are configured at planes that are oriented at 90-degrees from one another. One assembly 704 directs the pulse light to the plasma region 708 in the bulb 702, and the other assembly 706 directs the CW sustaining light to the plasma region 708 in the bulb 702. As described herein, the shapes of the pulsed illumination and the CW sustaining illumination in the plasma region 708 can be the same or different. The positions of the pulsed illumination and the CW sustaining illumination in the plasma region 708 can be overlapped or can be distinct. In some embodiments, the bulb 702 is filled with xenon gas. In some embodiments, the bulb 702 is formed in a spherical shape. Also, in some embodiments, a pressure in the bulb 702 filled with gas can be a pressure in a range of 20 atm to 50 atm.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. An electrodeless laser-driven light source comprising:
   a) a gas filled bulb comprising an ionizing gas;
   b) a laser source that generates a continuous wave (CW) sustaining light at an output;
   c) a pump laser that generates a pump light at an output;
   d) a Q-switched laser crystal positioned to receive the pump light generated at the output of the pump laser, the Q-switched laser crystal generating a pulsed laser light in response to the generated pump light and being configured so that the pulsed laser light propagates to a breakdown region in the gas filled bulb comprising the ionizing gas;
   e) a detector that detects a plasma light generated by a CW plasma generated at least partly in a CW plasma region in the gas filled bulb comprising the ionizing gas and generates a detection signal at an output; and
   f) a controller having an input that is electrically connected to the output of the detector and an output that is electrically connected to a control input of the pump laser, the controller generating control signals that control the pump light so as to extinguish the pulsed laser light within a time delay after the detection signal exceeds a threshold level.

2. The electrodeless laser-driven light source of claim 1 wherein the detection signal generated by the detector represents a power of the plasma light and the threshold level is a desired ratio of the power of the plasma light to an operating power.

3. The electrodeless laser-driven light source of claim 2 wherein the desired ratio is nominally 50%.

4. The electrodeless laser-driven light source of claim 2 wherein the desired ratio is nominally 90%.

5. The electrodeless laser-driven light source of claim 2 wherein the desired ratio falls within a range between 30% and 95%.

6. The electrodeless laser-driven light source of claim 1 wherein the pump laser and the Q-switched laser crystal are configured so that a period between pulses in the pulsed laser light is greater than the time delay.

7. The electrodeless laser-driven light source of claim 1 wherein the pump laser and the Q-switched laser crystal are configured so that a period between pulses in the pulsed laser light is less than the time delay.

8. The electrodeless laser-driven light source of claim 1 wherein the controller is configured so that the time delay is less than one pulse period of the pulsed laser light.

9. The electrodeless laser-driven light source of claim 1 wherein the pump laser and the Q-switched laser crystal are configured so that a pulse repetition rate of the pulsed laser light is in a range of 1 kHz to 20 kHz.

10. The electrodeless laser-driven light source of claim 1 wherein the pump laser and the Q-switched laser crystal are configured so that a pulse repetition rate of the pulsed laser light is less than or equal to 1 kHz.

11. The electrodeless laser-driven light source of claim 1 wherein the pump laser and the Q-switched laser crystal are configured so that a pulse energy of the pulsed laser light is in a range of 50 μJoules to 500 μJoules.

12. The electrodeless laser-driven light source of claim 1 wherein the pump laser and the Q-switched laser crystal are configured so that a pulse energy of the pulsed laser light is in a range of 500 μJoules to 5 mJoules.

13. The electrodeless laser-driven light source of claim 1 wherein the pump laser and the Q-switched laser crystal are configured so that a pulse duration of the pulsed laser light is in a range of 0.1 ns to 10 ns.

14. The electrodeless laser-driven light source of claim 1 wherein the laser source is configured so that a power of the CW sustaining light is in a range of 5 W to 50 W.

15. The electrodeless laser-driven light source of claim 1 wherein the laser source is configured so that a power of the CW sustaining light is in a range of 5 W to 1500 W.

16. The electrodeless laser-driven light source of claim 1 wherein the Q-switched laser crystal comprises a gain section and a saturable absorber section.

17. The electrodeless laser-driven light source of claim 1 wherein the Q-switched laser crystal comprises at least one of a glass host, an yttrium aluminum garnet host, or a spinel host.

18. The electrodeless laser-driven light source of claim 1 wherein the Q-switched laser crystal comprises at least one of a chromium dopant, a cobalt dopant or a vanadium dopant.

19. The electrodeless laser-driven light source of claim 1 wherein the Q-switched laser crystal comprises a narrow-band filter.

20. The electrodeless laser-driven light source of claim 19 wherein the narrow-band filter reflects at least some of the plasma light.

21. The electrodeless laser-driven light source of claim 19 wherein the narrow-band filter blocks wavelengths in the xenon spectrum.

22. The electrodeless laser-driven light source of claim 1 wherein the Q-switched laser crystal comprises a coating on one surface.

23. The electrodeless laser-driven light source of claim 1 wherein the gas-filled bulb comprises xenon gas.

24. The electrodeless laser-driven light source of claim 1 wherein the gas-filled bulb is formed in a spherical shape.

25. The electrodeless laser-driven light source of claim 1 wherein a pressure in the gas-filled bulb comprises a pressure in a range of 20 atm to 50 atm.

* * * * *